July 5, 1955 A. L. JONES ET AL 2,712,386
METHOD AND APPARATUS FOR SEPARATING MATERIALS
BY CONTINUOUS LIQUID THERMAL DIFFUSION
Filed April 3, 1951 9 Sheets-Sheet 1

INVENTORS.
ARTHUR LETCHER JONES
ERNEST C. MILBERGER
BY

THEIR ATTORNEYS.

July 5, 1955

A. L. JONES ET AL 2,712,386

METHOD AND APPARATUS FOR SEPARATING MATERIALS
BY CONTINUOUS LIQUID THERMAL DIFFUSION

Filed April 3, 1951

INVENTORS.
ARTHUR LETCHER JONES
ERNEST C. MILBERGER
BY

Campbell, Brumbaugh, Free & Graves

THEIR ATTORNEYS.

July 5, 1955

A. L. JONES ET AL 2,712,386

METHOD AND APPARATUS FOR SEPARATING MATERIALS
BY CONTINUOUS LIQUID THERMAL DIFFUSION

Filed April 3, 1951

INVENTORS.
ARTHUR LETCHER JONES
ERNEST C. MILBERGER
BY

*Campbell, Brumbaugh, Free & Graves*

THEIR ATTORNEYS.

United States Patent Office 2,712,386
Patented July 5, 1955

2,712,386

METHOD AND APPARATUS FOR SEPARATING MATERIALS BY CONTINUOUS LIQUID THERMAL DIFFUSION

Arthur Letcher Jones, Lyndhurst, and Ernest C. Milberger, Maple Heights, Ohio, assignors to The Standard Oil Company, Cleveland, Ohio, a corporation of Ohio Application April 3, 1951, Serial No. 218,944

14 Claims. (Cl. 210—52.5)

The present invention relates to a method and apparatus for separating dissimilar materials in a liquid by continuous liquid thermal diffusion. More particularly, the invention is directed to a substantial improvement of the method and apparatus described and claimed in U. S. Patents 2,541,069, 2,541,070 and 2,541,071 granted February 13, 1951.

These patents describe a method of continuous liquid thermal diffusion and an apparatus therefor wherein a thin stream of liquid is passed through a slit defined by closely spaced walls. The walls are maintained at different temperatures, one being higher than the other, with the result that a temperature gradient is maintained across the thin stream of liquid in the slit. As a result of the heating of the portion of the liquid adjacent the wall having the relatively higher temperature, referred to more simply as "the hot wall," and the cooling of the liquid adjacent the wall maintained at the relatively lower temperature, referred to more simply as "the cold wall," a thermal circulation is set up wherein the liquid adjacent the hot wall rises in the slit and the liquid adjacent the cold wall descends. This thermal circulation brings about a countercurrent flow within the slit. The thermal diffusion effect created by the temperature gradient across the liquid in the slit operates to move one component of or in the liquid toward the cold wall and another toward the hot wall with the result that the two countercurrent streams in the slit are each enriched by one component or the other. The molecular movement in the liquid across the slit and the movement of the liquid upwardly along the hot wall and downwardly along the cold wall due to thermal circulation cooperate to concentrate liquid enriched with one component at the top of the slit and liquid enriched with another component at the bottom of the slit. In carrying out the method and utilizing the apparatus described in these patents, it is important that the rate of feed of liquid into the slit should not be such as to disturb the laminar flow of the countercurrent streams in the slit and promote mixing thereof.

The salient feature of the present invention that distinguishes it from the method and apparatus of Patents 2,541,069–071 is in the provision of a liquid-permeable membrane intermediate the hot and cold walls forming the slit. This membrane makes it possible to force the liquid into the slit at much higher rates without interfering with the movement of the components to be separated from one side to another due to the thermal diffusion effect and, furthermore, without causing physical mixing of the enriched liquid streams. The permeable membrane apparently functions as a barrier to gross flow between, or physical intermixing of the streams adjacent the hot and cold walls while permitting the components in the streams to pass freely through its pores and thus bring about a separation of the dissimilar components or materials in the initial liquid by continuous thermal diffusion.

The term "dissimilar materials" is used broadly in the present specification and the appended claims and is intended to refer to two or more components of a mixture in a liquid or liquefiable state, to different materials in a liquid or dissolved in a common solvent as well as to a solvent and a solute. Examples of such dissimilar materials are components of different viscosity indices contained in a lubricating oil, isomeric hydrocarbons, fatty oils having glyceride esters of fatty acids of different molecular weights and saturation, mixtures of hormones, viruses, antibiotics, etc., an azeotropic mixture of benzyl alcohol and ethylene glycol, the active vitamins and substances not having vitamin activity dissolved in fish oil, and the like.

The difference between the dissimilar materials may be extremely minute. Thus, for example, they may have the same empirical formula but differ slightly in structure or molecular weight.

The term "separation" as used hereinafter is intended to include not only separation in the ordinary sense of the word but also rectification, concentration, enrichment, and purification. Thus, for example, the "separation of dissimilar materials" includes the separation of petroleum products; the separation of benzyl alcohol and ethylene glycol from an azeotropic mixture of the same into two fractions, one of which is richer in benzyl alcohol and the other of which is richer in ethylene glycol than the starting mixture; the concentration or enrichment of active vitamins from a mixture of ordinarily inseparable components, one of which may have vitamin activity and the other not having such activity; the separation or concentration of antibiotics and other biological products containing the same; the separation or concentration of viruses; and the separation of vegetable oils, fats and waxes into components having different degrees of unsaturation, melting point and indices of refraction, the separation of lubricating oil into fractions having different viscosity indices and the like.

Generally, the apparatus of the present invention comprises at least two liquid-impervious, stationary walls of heat conductive material, the opposed faces of which are smooth, substantially parallel, and closely spaced to form a substantially uniform, narrow slit; and a liquid-permeable membrane in the slit, the membrane being intermediate, spaced from and substantially parallel to the slit-forming faces of the walls to divide the narrow slit into two narrower spaces, one on each side of the membrane. At least one of the walls is provided with heat transfer means capable of maintaining a temperature gradient between the slit-forming faces. In addition, one or more inlet and at least two take-off ports are provided for the continuous introduction of liquid to be subjected to thermal diffusion and for the continuous withdrawal of the materials separated thereby, at least one of the take-off ports being on the other side of the membrane from an inlet port.

To facilitate an understanding of the apparatus and method of this invention and of the results obtainable therewith, reference is made to the accompanying drawing wherein.

Figure 1:
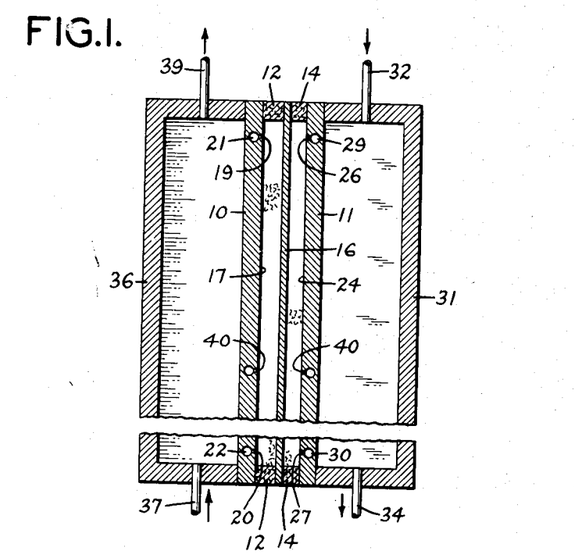
Figure 1 is a schematic view, in cross-section, of the apparatus of this invention.
Figure 2:
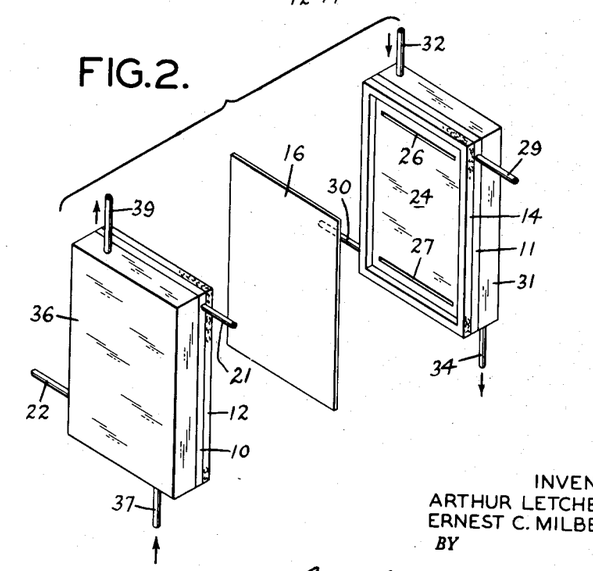
Figure 2 is a partially exploded view, in perspective, of the embodiment of the apparatus illustrated schematically in Figure 1.
Figure 3:
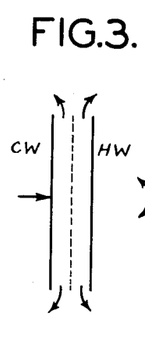
Figures 3 to 17 are self-explanatory, schematic illustrations of typical, efficient flow patterns.
Figure 4:
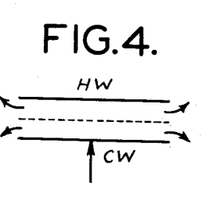
Figure 5:
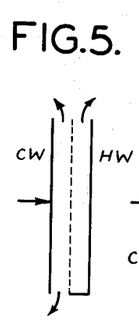
Figure 6:
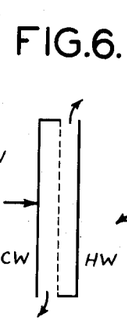
Figure 7:
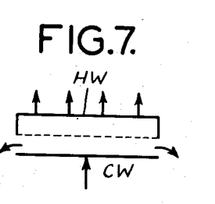

The apparatus illustrated by way of example in Figures 1 and 2 includes two rectangular, liquid impervious plates or walls 10 and 11 of heat conductive material, two gaskets 12 and 14 and a liquid permeable membrane 16. The face 17, not visible in Figure 2, of the plate or wall 10 is smooth and plane, and is provided, at or near the upper and lower ends of the plate, with ports 19 and 20 that communicate with lines 21 and 22, respectively. The face 24 of the plate or wall 11 is likewise smooth and plane and is also provided with ports 26 and 27 similar to 19 and 20 that communicate with lines 29 and 30. The plate 11 is provided with a heating jacket 31 serviced by a heating medium entering by way of line 32 and leaving by way of line 34. The other plate 10 may be similarly provided with a cooling jacket 36 serviced by a cooling medium entering by way of line 37 and leaving by way of line 39. It is within the scope of the invention to provide other ports, such as ports 40, at other locations in or adjacent the walls 10 and 11.

Figure 28:
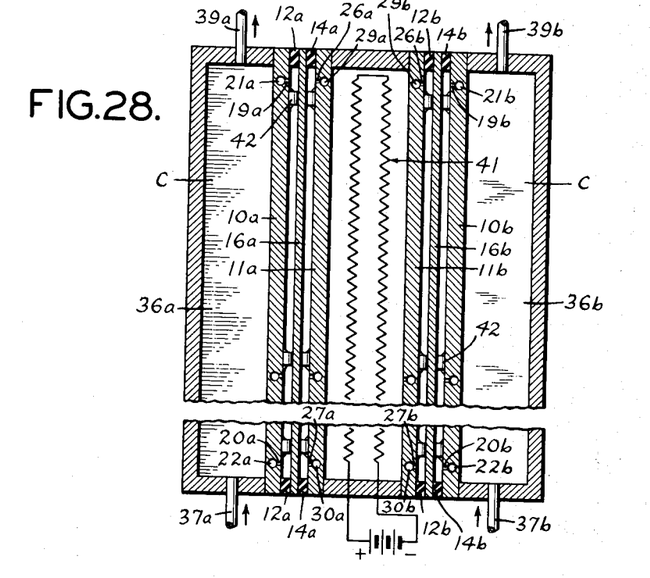
Figures 28 and 29 are schematic views, in cross-section, of further typical embodiments of the invention.

The apparatus illustrated schematically in Figure 28 is in essence similar to that illustrated in Figures 1 and 2, the only differences being that it comprises two thermal diffusion slits, the hot walls 11a and 11b of which are back to back and heated by means of one or more electrical resistance elements 41, and that the permeable membranes 16a and 16b are supported against lateral displacement by gasket strips 42 or the like. Parts of the apparatus shown in Figure 28 similar to corresponding parts in the apparatus of Figures 1 and 2 are indicated by like reference numerals.

Figure 29:
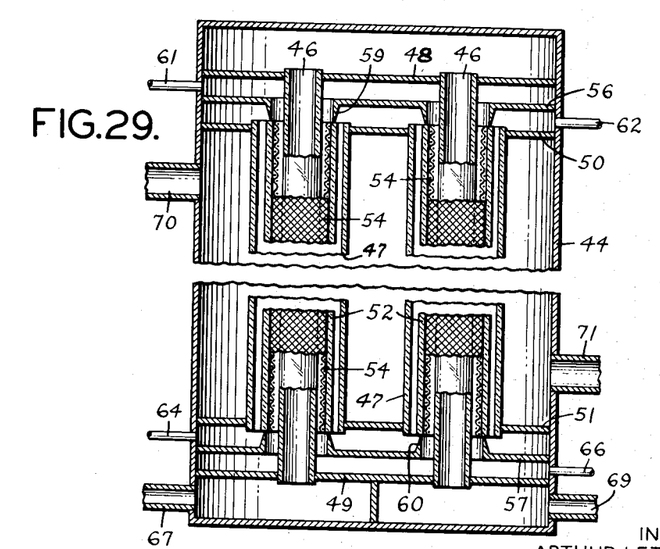

The apparatus illustrated schematically in Figure 29 is an embodiment in which the slit forming surfaces are in tubular form. The apparatus illustrated includes a shell 44, containing one or more sets of concentric tubes 46 and 47. The inner tubes 46 are supported by means of plates 48 and 49 and the outer tubes are supported by plates 50 and 51. In the annular slit formed by the outer wall of the inner tube 46 and the inner wall of the outer tube 47, a permeable membrane 52 is supported against lateral displacement by means of screening material 54 or the like.

Inlet and withdrawal ports communicating with the annular slit on one side or the other of the permeable membrane 52, are provided by means of baffle plates 56 and 57 having depending and upstanding flange members 59 and 60, respectively, and by lines 61, 62, 64 and 66 which communicate with the spaces between plates 48 and 56, 50 and 56, 51 and 57, and 49 and 57. A heating or cooling fluid for heating or cooling the inner tubes 46 may be introduced and withdrawn from the apparatus by way of lines 67 and 69 and a cooling or heating fluid to cool or heat the outer tubes 47 may be circulated through the apparatus by way of lines 70 and 71.

The walls may be of any suitable material, such as stainless steel, copper, aluminum, glass, brass or other alloys, that is liquid-impervious, heat conductive, and unreactive with any of the materials being separated. The opposed, slit-forming faces of the walls are spaced, by means of gaskets or the like, up to about 0.15 inch apart. Theoretically, there is no minimum spacing, or slit width, between the opposed wall faces but as a practical matter it is difficult to fabricate the walls and the permeable membrane within sufficiently small tolerances to obtain clearances between both sides of the membrane and the respectively adjacent wall faces without spacing the slit-forming wall faces at least about 0.01 inch apart. Spacings in the upper portion of the 0.01–0.15 in. range are feasible particularly when the membrane material is relatively thick and has good heat conductivity.

For optimum results, the combined thickness of the two spaces available for the flow of liquid, and therefore also of the gaskets, should be between about 0.02 and about 0.06 inch. Excellent results are obtainable, however, due to the much higher flow rates and separations made possible by the membrane, when the combined thickness of the gaskets is as great as about 0.08 inches.

Generally, the membrane must be permeable and reasonably inert with respect to, and unaffected as to permeability by, all components of the liquid to be subjected to continuous thermal diffusion. The membrane, preferably should also be capable of support to minimize lateral displacement due to pressure differences on the two sides thereof and consequent blocking of one or both spaces between the membrane and the slit-forming wall faces.

It has been found that membranes having a large number of very small pores give better results than membranes having a smaller number of larger pores, possibly because larger pores tend to permit gross flow of the liquid as distinguished from movement of molecules or the like through the pores due to thermal diffusive forces. The minimum size of the pores in the membrane is that sufficient to permit free movement, due to thermal diffusive forces, of all of the molecules or other particles in the liquid subjected to thermal diffusive forces. There is no critical upper limit to the size of the pores but it is generally preferable that the average pore size be not appreciably greater than about 5 to 10 microns on the average. Larger pore sizes do not by any means render the thermal diffusion process inoperable. They are undesirable, however, because such larger pore sizes promote gross flow of the liquid therethrough to an extent that results in a physical remixing of the enriched liquid components on the two sides of the membrane while adding nothing to the ease with which the molecules in the liquid may move across the slit due to the forces of thermal diffusion.

It is preferred to make the membrane thin or a good conductor or both. The optimum thickness is necessarily a compromise between a minimum for the requisite heat conductivity and a maximum for strength. If necessary, the membrane may be supported, on the low pressure side or on both sides, against lateral displacement by screening material, gasket strips or the like, as shown for example in Figures 28 and 29, but preferably the use of such support material is to be avoided in order to minimize interference with the laminar flow of the liquid parallel to the membrane.

Papers such as duplicator paper, 16-, 20- and 24-lb. bond paper, and tracing paper have been found quite suitable as membrane material. Films of bentonite clay, thin sheets of porous stainless steel, and a laminate of fiber-glass material impregnated with a finely divided filler such as clay also have been found suitable.

Referring now again to the apparatus shown in Figs. 1 and 2, it is desirable to secure the perimeter of the membrane 16 firmly between the gaskets 12 and 14 which also operate to space apart the opposed faces of the plates or walls 10 and 11 and form a substantially uniform slit having a width approximately equal to the combined thickness of the gaskets and membrane, the slit being divided into two spaces by the membrane 16.

The shape and position of the walls have no appreciable effect upon the degree of separation obtained. The slit formed by the opposed wall faces may be long and narrow, as in the liquid thermal diffusion apparatus described in U. S. Patent 2,541,069 wherein no membrane is provided, or it may be square, trapezoidal or of any other shape. The walls may also be formed of concentric tubes, the outer surface of the inner tube forming one face of the slit and the inner surface of the outer tube forming the opposite face of the slit. Unlike the apparatus described in Patent 2,541,069, the degree of separation obtained with the apparatus of this invention is not dependent, where the slit is in a vertical position, upon the height of the slit and, again unlike said patented apparatus, the apparatus of this invention may be operated in any desired position, i. e., vertically as shown or horizontally, or inclined between vertical and horizontal.

When the apparatus is inclined or horizontal the cold wall preferably should not be above the hot wall.

Typical efficient flow patterns are illustrated schematically in Figures 3 to 15 of the drawing, which are self-explanatory, the symbols "HW" and "CW" signifying hot wall and cold wall, respectively, the membrane being indicated by a dash line, the absence of an open port at an end of a space between the membrane and one wall being indicated by a line connecting the end of the membrane and the wall, and the positions of the arrows indicating the locations of the ports, the inwardly pointing arrows indicating inlet ports and the outwardly pointing arrows indicating take-off ports.

Figure 16:
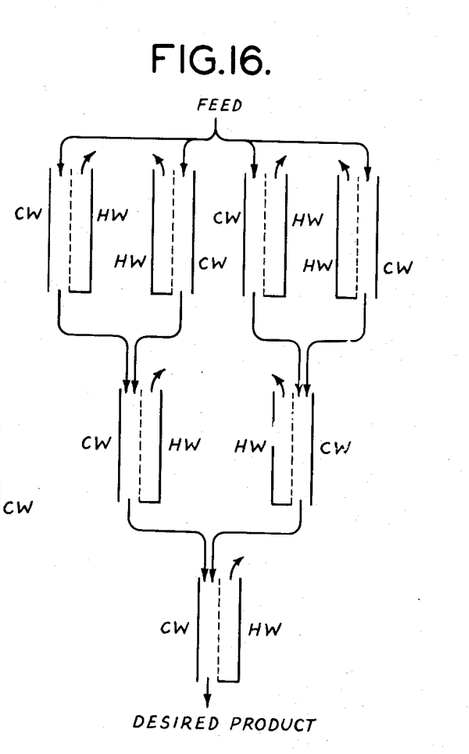
Figure 17:
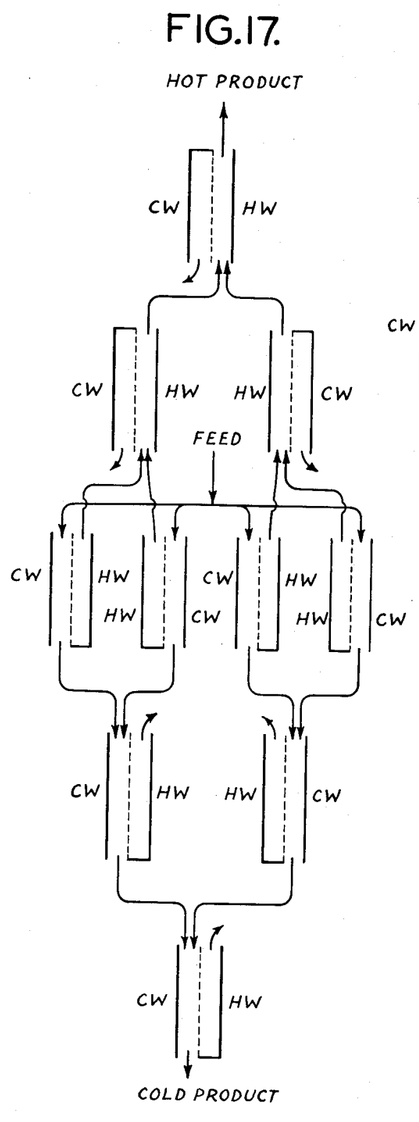

In addition, it is within the scope of this invention to carry out thermal diffusion separation in a plurality of such devices wherein, if desired for the purpose of convenience, a single heating jacket may be utilized to heat two or more hot wall surfaces and a single cooling jacket may be utilized to cool two or more cold wall surfaces. Typical efficient flow patterns for such multiple slit operations are illustrated schematically in Figures 16 and 17 of the drawing, wherein the symbols are similar to those used in Figures 3 to 15. Furthermore, the apparatus may be made in tubular form, as shown for example in Figure 29, wherein the cold wall surface, for example, is formed by the outside surface of a hollow tube provided with cooling means in the interior and the hot wall surface is formed by the inner wall of a larger tube surrounding the smaller tube, or vice versa.

It has been found that the degree of separation obtained with the apparatus of this invention is dependent primarily, all other conditions being equal, upon the area of the permeable membrane. For structural simplicity, therefore, it has been found preferable to utilize flat and substantially square sheets of metal as the walls.

At least one, and if required, both of the walls are provided with heat transfer means capable of maintaining a temperature gradient between the slit-forming faces. One wall, referred to herein as the hot wall, may be provided, as shown by way of example in Figures 1 and 2, on the side opposite the slit-forming face thereof, with a jacket for the circulation of hot water, steam or other heating medium. Alternatively, it may be provided with electrical or any other suitable heating means, as shown for example in Figure 28. If the boiling point or decomposition temperature of the liquid to be subjected to thermal diffusion requires the maximum temperature in the slit to be at or below room temperature, the hot wall need merely be exposed to the air or be subjected to cooling to the required maximum temperature by means of a water jacket or the like. The other wall, referred to herein as the cold wall, may simply be exposed to air, be provided with heating means similar to or different from that provided for the hot wall, or be provided with cooling means to cool the cold wall to a temperature below room temperature. It is to be understood, of course, that if the freezing point, crystallization temperature, and viscosity of the liquid subjected to thermal diffusion require heating of both the hot and cold walls, the hot wall will be heated to a temperature higher than that of the cold wall and, conversely, if the boiling point or temperature stability of the liquid requires cooling of both walls, the cold wall will be cooled to a temperature below that of the hot wall.

The inlet port or ports are preferably positioned and constructed in such manner as to minimize turbulence in the flow of the liquid entering the slit. One or more inlet ports may be in or adjacent the cold wall, the hot wall or both walls and at or intermediate the ends thereof. In one preferred embodiment, suitable where the slit is vertical, horizontal or inclined, one inlet port or a series of inlet ports are provided in one wall midway between the ends thereof as shown at 40 in Figure 1. In another preferred embodiment, one or a series of inlet ports are provided at one end adjacent one wall and another, or a series of other inlet ports are provided at the other end adjacent the other wall. In still another embodiment, one or a series of inlet ports are provided only at one end adjacent one wall. Where, in the latter two embodiments, the slit is vertical or slightly inclined, and where the inlet port or ports is adjacent the cold wall, the port or ports are preferably located at or near the upper end of the slit and the port or ports, if any, adjacent the hot wall are preferably located at or near the lower end of the slit to minimize turbulence due to interference with the direction of thermal circulation within the slit.

The take-off ports are preferably positioned and constructed in much the same manner as the inlet ports. It is preferred that at least one inlet port and at least one take-off port be located on opposite sides of the membrane and further that any take-off ports on the same side of the membrane as an inlet port always be located at a point or points remote from that inlet port.

Any given inlet or take-off port may comprise a tubular element communicating directly with one of the two spaces between the membrane and the slit-forming walls or a tubular element parallel to one of the wall faces and provided with a series of openings communicating with one of the two aforementioned spaces.

The method of the present invention consists generally in continuously introducing a liquid consisting of, or containing dissolved therein, two or more dissimilar materials into the space or spaces between one or both of the opposing wall faces and the intermediate membrane, thereby in effect forming streams of liquid in the spaces and continuously adding liquid to at least one of said streams, subjecting the liquid so introduced to a temperature gradient across the slit between the opposed walls and withdrawing one portion of the liquid containing a higher than initial proportion of one of the dissimilar materials from the space between one of the opposing wall faces and the membrane and withdrawing another portion of the liquid containing a higher than initial proportion of another of the dissimilar materials from the space between the other opposing wall faces and the membrane.

Bearing in mind that the temperature at the hot wall should not be above the boiling or decomposition point of the liquid or any of its enriched components and that the temperature at the cold wall should not be below the freezing point or crystallization temperature of the liquid or any of its enriched components, nor so low as to render it too viscous, it is generally desirable to operate with as great a temperature gradient as possible. The efficiency of separation is remarkably improved with an increase in the temperature difference between the hot and cold walls. Thus, for example, a considerable improvement is obtained by raising the temperature gradient from 100° to 200°, e. g., by increasing the hot wall temperature or lowering the cold wall temperature.

It is also within the contemplation of this invention to utilize a plurality of membrane-containing thermal diffusion columns. This is advantageous, particularly when the slits are in vertical position, because one heating jacket or other source of heat can be utilized more economically to heat two or more hot walls and one cooling jacket can be utilized similarly to cool two or more cold walls. The passage of the liquid through a series of thermal diffusion columns increases the capacity for liquid to be separated into the desired components and/or increases the degree of separation obtainable at high flow rates. Typical flow patterns for such operations are illustrated by way of example in Figures 16 and 17 of the drawing.

It is manifest that the preferred methods may be varied considerably without departing from the invention. In selecting a given flow pattern, it is desirable, but not necessary, that the direction of introduction of the liquid to be subjected to thermal diffusion and the take-off of the dissimilar portions be such that they do not interfere with the thermal circulation of the liquid within the slit, especially at low flow rate. Inasmuch as the liquid adjacent the hot wall will tend to rise and that adjacent the cold wall will tend to descend, it is advantageous, therefore, when the slit is vertical or inclined, to introduce any liquid adjacent the cold wall at the top or at least in the upper portion of the slit so that its direction of introduction will coincide with the thermal circulation. Similarly, if the slit is vertical or inclined, any initial liquid introduced adjacent the hot wall, for optimum results, should be introduced at or in the lower portion of the slit so that it will tend, initially at least, to flow upwardly or concurrently with the direction of thermal circulation. Substantially the same reasoning holds true for the directions of take-off. The liquid between the cold wall and the membrane is preferably taken off at or near the bottom of the space between the cold wall and the membrane inasmuch as the liquid adjacent the cold wall tends to flow in that direction. Liquid removed from the space between the hot wall and the membrane is preferably taken off at or near the top of the space between the hot wall and the membrane because of the upward direction of thermal circulation in this portion of the slit.

These considerations with reference to the direction of introduction and removal of the initial liquid and the treated portions, respectively, are important particularly in order to obtain the maximum efficiency directly attributable to the membrane in the slit. It has been found that it is possible in a number of instances to introduce the liquid at a rate in excess of its rate of thermal circulation within the slit. Thus, the rate of movement of the liquid within the slit due solely to the difference in temperature between the hot wall and the cold wall may be augmented by the pressure differential between the liquid entering and the liquid withdrawn.

The method of the present invention is to be distinguished from separation methods based on osmosis and dialysis as well as from gaseous thermal diffusion methods and static liquid thermal diffusion methods.

In osmosis the separation or concentration of a solute in a solvent depends upon the semi-permeability of a membrane permeable to the solvent and impermeable to the solute. Thus, for example, an aqueous sugar solution confined at least in part by a suitable membrane will become more concentrated due to the fact that the water will readily pass through the membrane whereas the sugar molecules cannot. In the method of the present invention the membrane intermediate the hot and cold walls is equally permeable to all of the materials initially introduced including the dissimilar materials to be separated.

In dialysis, a mixture of a colloid and a non-colloid can be separated by the action of a semi-permeable membrane. Thus, for example, where an aqueous solution of both an ionized solute and a colloid is confined at least in part by a suitable membrane, the colloid will remain while the ionized solute will pass through because the membrane is permeable only to the latter.

In contrast to separation by osmosis or dialysis, separation by liquid thermal diffusion is dependent upon the existence of a temperature gradient across a thin stream of the liquid and upon the ability of dissimilar molecules therein to move from the hot side to the cold side, or vice versa, without any substantial restraint. The membrane used in the method of this invention, which has been described heretofore, in detail, is pervious to all molecules in the liquid and is therefore a barrier only in the sense that it minimizes physical mixing of the liquids adjacent the hot and cold walls and hence permits forced flow pattern. Such membranes are referred to hereinafter as liquid-permeable membranes.

The apparatus and method of this invention possess all of the advantages of the apparatus and methods described in United States Patents Nos. 2,541,069–071. In addition to these advantages, the apparatus and method of the invention possess a number of further important advantages over said patented apparatus and methods. One of these advantages is that the efficiency, i. e., a multiple of the degree and speed of separation, can be increased several hundred per cent over that obtained in columns not provided with a permeable membrane. The reason for the tremendous increase in the efficiency is not thoroughly understood, but it is believed that it is due at least in part to the ability of the membrane to keep the dissimilar materials, after having been separated by thermal diffusion, from remixing to any appreciable extent before they are withdrawn from the slit even when the rate of flow of the liquid is forced beyond the rate due solely to the difference in temperature at the hot and cold walls. Another of these advantages is that the degree of separation is dependent on the membrane area rather than the height of the slit and that consequently columns can be constructed more economically.

A great number of tests, described in the following examples, were carried out to determine the effect, on the efficiency of separation, of varying the flow pattern, temperature gradient, membrane, column height and other possible variables involved in the practice of this invention. For comparative purposes, the liquid, referred to herein simply as the test mixture, subjected to continuous thermal diffusion in these tests was a synthetic binary solution composed of a 50–50 mixture of cetane and methylnaphthalene, this liquid being chosen because the index of refraction difference between the two fractions is large, thus providing easy measurement of concentration changes. All concentration changes produced in these tests are expressed in terms of index of refraction changes. The index of refraction values were measured by means of an Abbe refractometer, the index of refraction at 20° C. of methylnaphthalene being 1.6081, of cetane 1.4344 and of the 50–50 mixture 1.5210, a total difference of 0.1737 which is the same difference when measured at 25° C., and the degree of separation was expressed as the difference in refractive index between the two products.

Without intending to limit in any way the scope of the invention, but merely to illustrate the operativeness and utility of the apparatus and method herein described, a number of examples are included in this description.

*Example 1*

The test mixture was subjected to thermal diffusion at varying rates in two columns similar to that illustrated in Figure 1. Each column was formed by two plane, smooth brass plates, the opposed surfaces of which were spaced apart about 1/16 in. by 1/32 in. thick gaskets adjacent the edges, a duplicator paper membrane being held, by and between the two gaskets, in a position parallel to and midway between the opposed faces of the slit-forming walls. In both columns the effective width of the wall surfaces was 1½ in., in one of the effective height was 5 ft. and in the other the effective height was 1¼ ft. The areas of the membranes were therefore 90 sq. in. in the 5-ft. column and 22½ sq. in. in the 1¼ ft. column. One wall of each column was provided with a heating jacket supplied continuously with saturated steam at 212° F. and the other wall of each column was provided with a cooling jacket supplied continuously with tap water at 70° F.

Figure 8:
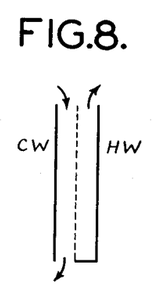

The flow pattern used in these tests was that illustrated schematically in Figure 8. The hot and cold wall products were taken off at equal rates. The results obtained with the 5-ft. and the 1¼-ft. columns are shown in curves A and C, respectively, of Figure 18.

Figure 18:
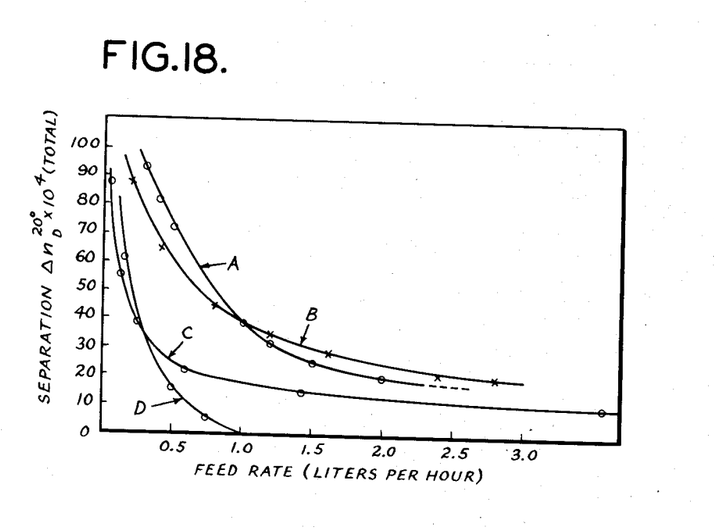
Figures 18 to 27 are graphic representations of the performance of the method and apparatus of this invention under varying conditions.

It is apparent from an examination of these curves that curve C, at feed rates greater than 1.0 liter/hr., instead of being ¼ as high, is more nearly ½ as high as curve A. This leads to the conclusion that the degree of separation by continuous liquid thermal diffusion in a column having a membrane is not a direct function of the height of the column as it is in continuous liquid thermal diffusion carried out without the use of a membrane.

Curve B of Figure 18 represents a curve calculated by multiplying by 4, along the rate axis, the rate values in curve C. It will be noted that curves A and B coincide almost within experimental error over the entire range of rates. This is believed to be excellent evidence that the rate-separation performance of a continuous liquid thermal diffusion column having a membrane is a function of membrane surface area and not of height.

The test mixture was also subjected to continuous thermal diffusion in the 5-ft. column, the membrane, however, having first been removed, all other conditions remaining the same. The performance of the column without the membrane was plotted on the graph of Figure 18 and is shown as curve D. Comparison of curves A and D reveals that the rate and degree of separation obtained in a column having a membrane are by far superior to those obtained with one not having a membrane.

*Example 2*

The test mixture was subjected to continuous thermal diffusion at varying rates in a column formed by two plane, smooth brass plates, each 10 in. square, spaced apart about 1/16 in. by two 1/32 in. thick gaskets adjacent the edges, a 20-lb. opaque Strathmore Bond paper serving as the membrane and being held by and between the two gaskets in a position parallel to and midway between the opposed faces of the slit-forming walls. The effective width and height of the wall surfaces was 9 1/4 in. and the area of the membrane was 85.5 sq. in. One wall of the column was provided with a heating jacket supplied continuously with saturated steam at 212° F. and the other wall was provided with a cooling jacket supplied continuously with tap water at 70° F.

Figure 19:
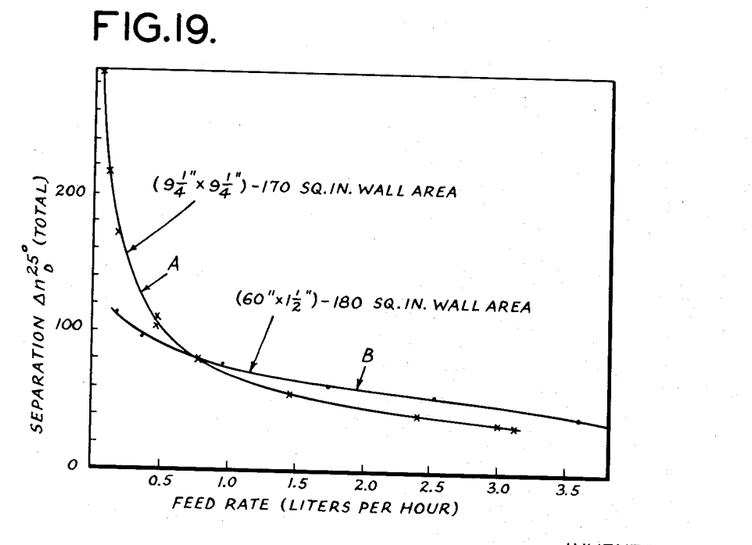

For comparison, the test mixture was also subjected to continuous thermal diffusion at varying rates in the 5-ft. column described in Example 1, provided with a 20-lb. Strathmore Bond paper as the membrane instead of with a duplicator paper as the membrane. The flow pattern used in these tests was that illustrated schematically in Figure 8. The hot and cold wall products were taken off at equal rates. The results obtained with the 9 1/4 in. square column and the 5-ft. column are shown in curves A and B, respectively, of Figure 19.

These curves are believed to show that above a feed rate of about 1.0 liter/hr., the separation efficiencies of the two columns are practically the same and that, all other conditions being equal, they are a function of the membrane area.

*Example 3*

The test mixture was subjected to continuous thermal diffusion at varying rates in the 5-ft. column described in Example 1 but equipped with a 20-lb. opaque Strathmore Bond membrane. In one series of tests, the column was vertical, the test mixture was introduced midway between the ends of the cold wall and the flow pattern was that illustrated in Figure 3. In the other series of tests all conditions were the same except that the column was horizontal with the hot wall on top and the flow pattern was that illustrated in Figure 4. The temperatures of the hot and cold walls were maintained at 212° F. and 70° F., respectively, in the same manner as in Example 1. The rates of withdrawal of product were equal at all take-off ports.

Figure 20:
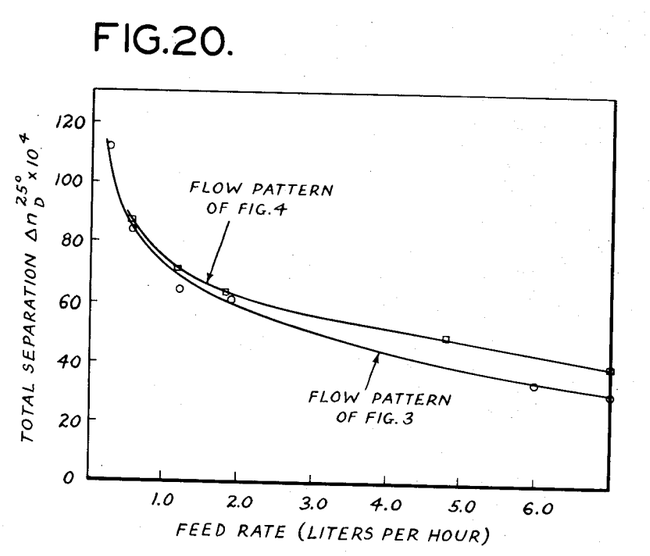

The results obtained with the vertical and horizontal columns are shown in Figure 20.

These curves are believed to show that comparable results are obtained with vertical and horizontal columns so long as in the horizontal column the hot wall is on top.

*Example 4*

Figure 9:
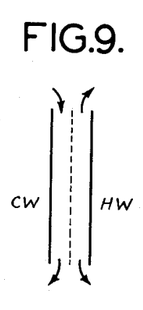
Figure 10:
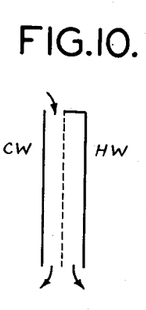
Figure 11:
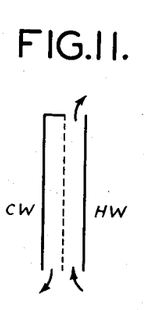
Figure 12:
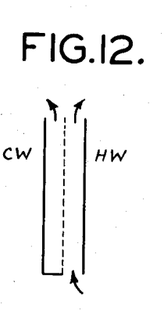
Figure 13:
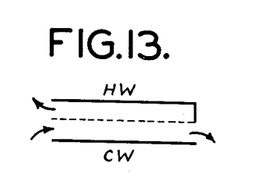
Figure 14:
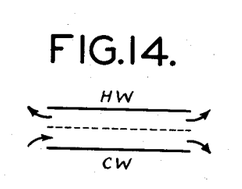
Figure 15:
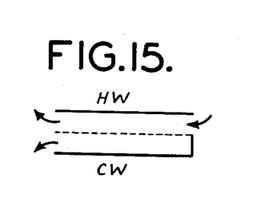

The tests described in Example 3 were repeated, the only difference being that the flow patterns of Figures 9 and 14 were used.

Figure 21:
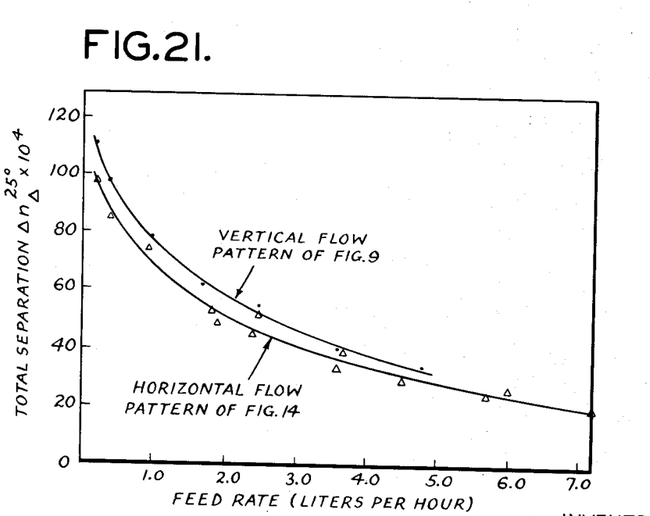

The results obtained with the vertical and horizontal columns are shown in Figure 21. Comparison of the curves shows that slightly better results were obtained with the column in the vertical position apparently due to the fact that the thermal flow adds to the speed of the forced flow.

*Example 5*

The 5-ft. column described in Example 1, equipped with a duplicator paper membrane, was used to compare the effects of flow patterns concurrent with thermal flow with flow patterns countercurrent to thermal flow. The hot and cold walls were maintained at 212° F. and 70° F., respectively, in the manner described. The results are shown in curves A, B, C and D of Figure 22. The flow patterns used were those indicated schematically in Figure 22.

Figure 22:
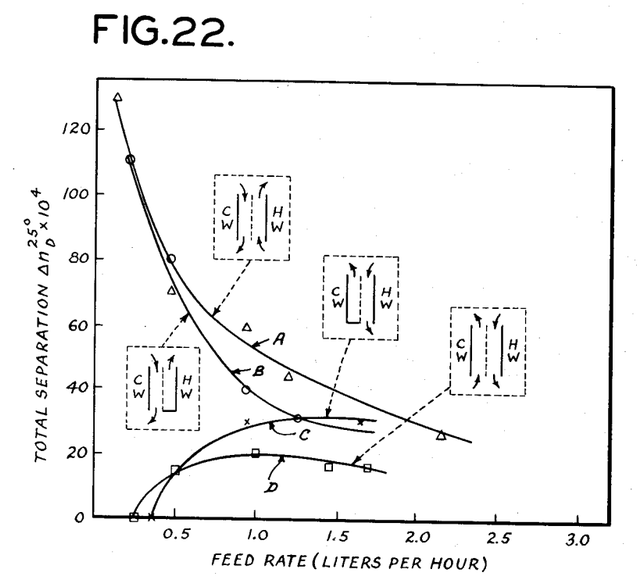

Comparison of curves A and B with curves C and D reveals that flow patterns opposing thermal flow approach the efficiency of the preferred flow patterns only at the higher feed rates and are therefore feasible when low level separation with high feed rates is considered satisfactory. Thus, for example, it is noted that a flow pattern wherein the test mixture is introduced at the top adjacent the hot wall, and the hot and cold wall products are removed at equal rates at the bottom of the hot wall and the top of the cold wall, respectively, yields better results than one in which half of the test mixture is introduced at the bottom adjacent the cold wall, the other half is introduced at the top adjacent the hot wall, and the hot and cold products are removed as in the other non-preferred flow pattern.

These results indicate that flow patterns concurrent with thermal flow are much superior to countercurrent flow patterns at slow rates but that at fast rates the effect of thermal flow becomes less significant. Flow patterns countercurrent to thermal flow are, for example, effective in multiple operations in which there are repeated separations at high feed rates.

*Example 6*

Two series of tests were carried out with the 9 1/4 in. square apparatus described in Example 2, the hot wall, however, being maintained at a temperature of 320° F. instead of 212° F. In one series of tests, the flow pattern illustrated in Figure 11 was used and in the other the flow pattern of Figure 12 was used.

Figure 23:
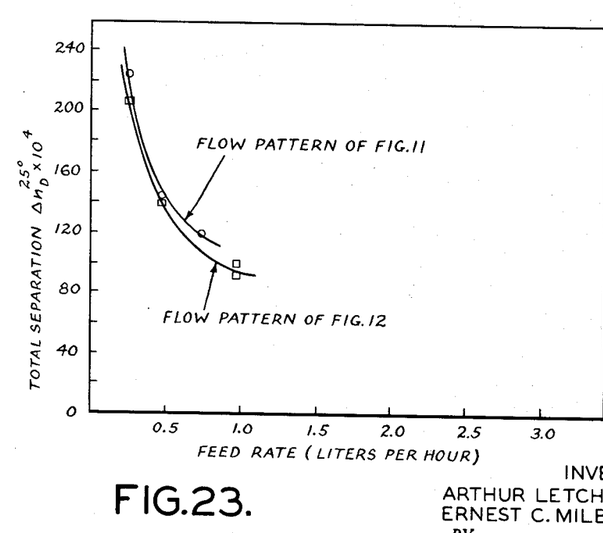

The results, shown in the graph of Figure 23, reveal that they are comparable.

*Example 7*

Two series of tests were carried out with the 9 1/4 in. square apparatus described in Example 2, the hot wall, however, being maintained at a temperature of 320° F. instead of 212° F. In one series of tests, the flow pattern illustrated in Figure 8 was used and in the other the flow pattern of Figure 10 was used.

Figure 24:
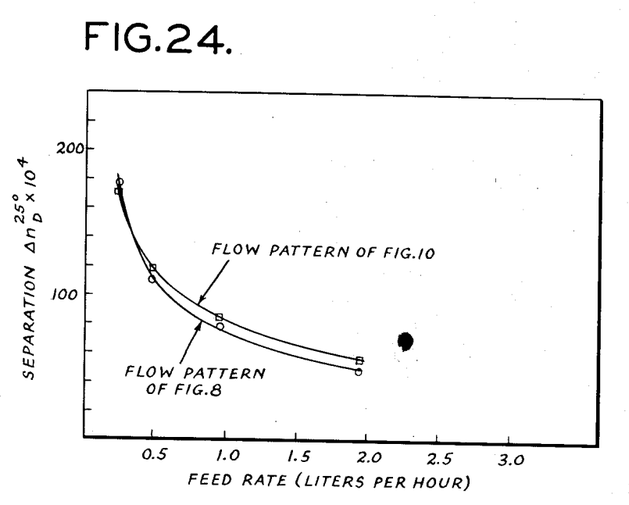

The results, shown in the graph of Figure 24, reveal that they are comparable.

*Example 8*

A series of test runs was carried out in the 9 1/4 in. square apparatus described in Example 2. The membrane was a stainless steel membrane having a thickness of 0.07 in. and an average pore size of about 5 microns. The combined thickness of the two gaskets holding the membrane midway between the hot and cold walls was in each instance 0.037 in. The distance between the hot and cold walls was therefore 0.107 in. The hot wall was maintained at 265° F. and the cold wall at 120° F. The flow pattern was that illustrated in Figure 8.

Figure 25:
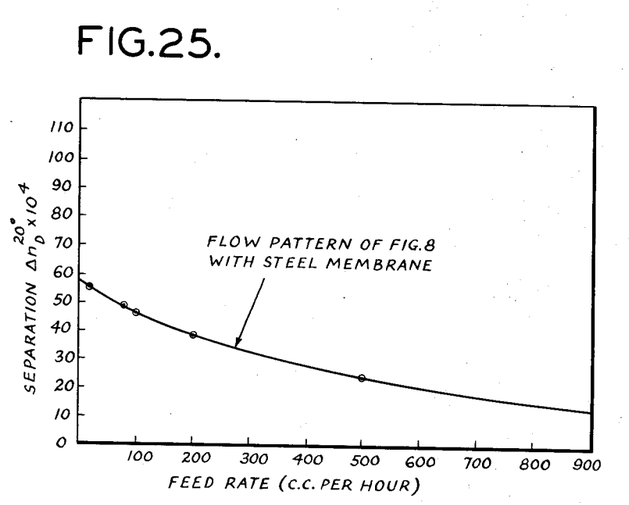

The results are shown in Figure 25.

*Example 9*

A lubricating petroleum oil stock having a viscosity of

330 SSU at 100° F. and an $N_D^{20}$ of 1.5025, referred to by the trade name #300 Red oil, was subjected to thermal diffusion at varying rates in the 5-ft. column described in Example 1. In one run the column was equipped with duplicator paper as a membrane and the flow pattern was that illustrated in Figure 8, the rates of withdrawal being equal. Another run was made, for comparative purposes, in the same column with the membrane removed, the initial Red oil being introduced at a point midway between the two ends and the products being removed at the top and bottom at equal rates.

The column was vertical in both runs, the hot wall was heated by steam at atmospheric pressure, the cold wall was cooled with tap water at 70° F. and the liquid was forced through the apparatus by means of a gravity reservoir located approximately five feet above the top of the column.

Figure 26:
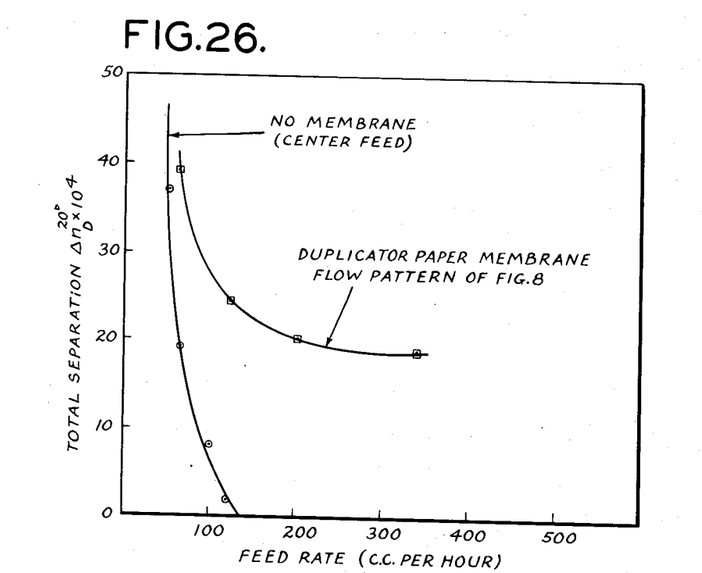

The results of these runs are shown in Figure 26. They are believed to show that the ability to obtain separations with the test mixture in the previous examples is indicative of the applicability of the method and apparatus of the invention to liquids generally and to confirm the remarkably superior results obtainable with a membrane column as compared with one not provided with a membrane.

*Example 10*

An azeotropic mixture of benzyl alcohol and ethylene glycol, prepared by mixing 56 parts by weight of benzyl alcohol with 44 parts by weight of ethylene glycol, distilling the mixture at atmospheric pressure and collecting only the distillate obtained at a constant boiling temperature, was subjected to thermal diffusion at varying rates in the 5-ft. column described in Example 1 equipped with a tracing paper membrane. The conditions were identical with those described in Example 9.

Figure 27:
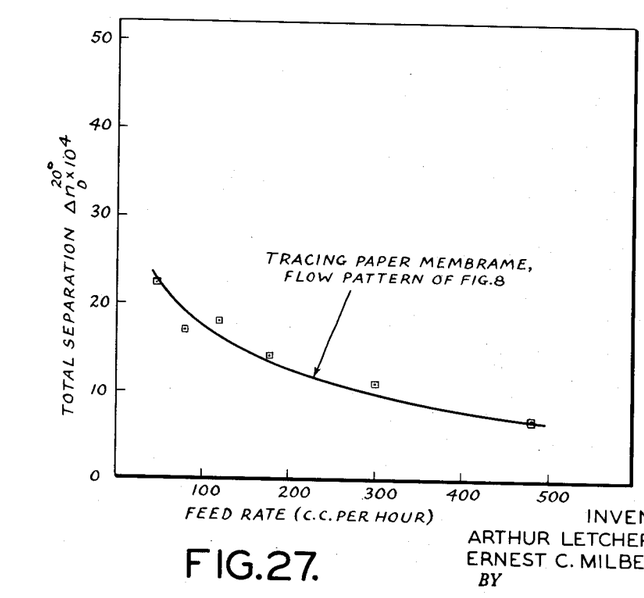

The results of this run are shown in Figure 27.

These results, and the similar results obtained with the test mixture of Examples 1–8 and the Red oil of Example 9, show that the method and apparatus of this invention is extremely useful in the separation of all types of dissimilar materials, even such difficultly separable materials as benzyl alcohol and ethylene glycol in an azeotrope.

It is believed to be evident from the results accomplished with horizontal and vertical flow pattern that similar results can be obtained when the slit is in an inclined position so long as the cold wall is not above the hot wall. It is to be understood, therefore, that the term "substantially vertical" is intended to include positions from about 45° inclination to absolute vertical and that the term "substantially horizontal" is intended to include positions from about 45° inclination to absolute horizontal.

We claim:

1. Liquid thermal diffusion apparatus comprising two liquid-impervious, stationary walls of heat conductive material, the opposed faces of which are spaced apart between about 0.01 and about 0.15 inch to form a substantially uniform narrow slit, at least one of said walls being provided with heat transfer means for maintaining a temperature gradient between said slit-forming faces, a liquid-permeable membrane in said slit, said membrane having a multiplicity of holes of a size sufficient to allow the molecules of the dissimilar materials to pass therethrough but insufficient to allow gross flow of liquid through the membrane and being intermediate and spaced from the slit-forming faces of the walls to form a first substantially uniform space between one of the wall faces and the membrane and a second space between the other of said wall faces and the membrane, and means for feeding and withdrawing liquid comprising an inlet port communicating with the first space, a first take-off port communicating with said first space at a point remote from the inlet port, and a second take-off port communicating with the second space.

2. The apparatus defined in claim 1 wherein the sum of the thicknesses of said first and second spaces is between about 0.02 and about 0.06 inch.

3. The apparatus defined in claim 1 wherein an inlet port communicates with the first space intermediate the ends thereof and take-off ports communicate with the first and second spaces at the ends thereof.

4. The apparatus defined in claim 1 wherein one inlet port communicates with the first space at one end thereof, another inlet port communicates with the second space at the end opposite said one end, a take-off port communicates with the first space at said opposite end thereof, and another take-off port communicates with the second space at said one end thereof.

5. The apparatus defined in claim 1 wherein an inlet port communicates with the first space at one end thereof, a take-off port communicates with the first space at the end opposite said one end, and another take-off port communicates with the second space at said one end.

6. The apparatus defined in claim 1 wherein the slit is vertical.

7. The apparatus defined in claim 1 wherein the slit is horizontal, the upper wall forming the slit being provided with heat transfer means to maintain the temperature thereof at an elevation higher than that of the lower wall.

8. The apparatus of claim 1 in which the two walls are formed of concentric tubes.

9. The apparatus defined in claim 1 wherein one inlet port communicates with the first space at one end thereof, a take-off port communicates with the first space at a location remote from said one end and another take-off port communicates with the second space, likewise at a location remote from said end.

10. Liquid thermal diffusion apparatus comprising four liquid-impervious, stationary walls of heat conductive material, two of said walls being substantially parallel to one another and having smooth, opposed faces spaced between about 0.01 and about 0.15 inch apart to form a substantially uniform narrow slit, the other two of said walls being likewise substantially parallel and having smooth, opposed faces spaced between about 0.01 and about 0.15 inch apart to form a second substantially uniform narrow slit, heat transfer means between one of the first two walls and one of the second two walls to maintain temperature gradients between the opposed smooth faces in each slit, a liquid-permeable membrane in each slit, each membrane being intermediate, spaced from, and substantially parallel to the slit-forming faces of the walls to form a first space between one of the wall faces and the membrane and a second space between the other of the wall faces and the membrane, and means for feeding and withdrawing liquid comprising an inlet port communicating with the first space in the first slit, a first take-off port communicating with said first space in the first slit at a point remote from the inlet port, a second take-off port communicating with the second space in the first slit, a second inlet port communicating with the first space in the second slit and with one of the first and second take-off ports of the first slit, a third take-off port communicating with the first space in the second slit at a point remote from the second inlet port, and a fourth take-off port communicating with the second space in the second slit.

11. A method of continuously separating dissimilar materials in a liquid, by a liquid thermal diffusion process, which comprises forming two adjacent thin films of said liquid having a combined thickness between about 0.01 and about 0.15 inch, maintaining a temperature gradient across said two adjacent films whereby thermal diffusive forces are created in the liquid to move molecules of one of the dissimilar materials in one direction to enrich one of the liquid films therewith and to move molecules of another of the dissimilar materials in the opposite direction to enrich the other of the liquid films therewith, continuously adding liquid to at least one of said liquid films and continuously withdrawing liquid from both of said enriched films, the total rate of addition of liquid being equal to the total rate of withdrawal, and inhibiting gross flow between said two liquid films by interposing between the two adjacent films a liquid-permeable membrane having a multiplicity of holes of a size sufficient to allow the molecules of the dissimilar materials to pass therethrough but insufficient to allow gross flow of liquid through the membrane, whereby movement from one film to the other is limited to the movement caused by diffusive forces, and the enriched films are prevented from intermixing prior to said withdrawal.

12. The method defined in claim 11 wherein the liquid is continuously introduced into the one stream at a point intermediate the ends thereof and withdrawn, at substantially equal rates, from both streams at points remote from the point of introduction.

13. The method defined in claim 11 wherein the liquid is continuously introduced into the one stream at one end thereof and withdrawn, at substantially equal rates, from both streams, the withdrawal from said one stream being at a point remote from the point of introduction.

14. The method defined in claim 11 wherein the combined thickness of the two streams is between about 0.02 and about 0.06 inch.

References Cited in the file of this patent

UNITED STATES PATENTS

| | | |
|---|---|---|
| 2,158,238 | Hvid | May 16, 1939 |
| 2,521,112 | Beams | Sept. 5, 1950 |
| 2,541,069 | Jones et al. | Feb. 13, 1951 |
| 2,541,070 | Jones et al. | Feb. 13, 1951 |
| 2,541,071 | Jones et al. | Feb. 13, 1951 |
| 2,567,765 | Debye | Sept. 11, 1951 |
| 2,688,404 | Wahl | Sept. 7, 1954 |

FOREIGN PATENTS

| | | |
|---|---|---|
| 126,166 | Sweden | Sept. 20, 1949 |